March 31, 1953 S. I. TOURSHOU 2,633,555
BEAM DEFLECTION CONTROL
Filed Sept. 27, 1947 2 SHEETS—SHEET 1

INVENTOR.
Simeon I. Tourshou
BY Samuel B. Smith
ATTORNEYS.

March 31, 1953 S. I. TOURSHOU 2,633,555

BEAM DEFLECTION CONTROL

Filed Sept. 27, 1947 2 SHEETS—SHEET 2

INVENTOR.
Simeon I. Tourshou
BY Samuel B. Smith
ATTORNEYS.

Patented Mar. 31, 1953 2,633,555

UNITED STATES PATENT OFFICE 2,633,555

BEAM DEFLECTION CONTROL

Simeon I. Tourshou, Philadelphia, Pa., assignor to Radio Corporation of America, a corporation of Delaware Application September 27, 1947, Serial No. 776,464

20 Claims. (Cl. 315—27)

The present invention relates to means for producing deflection of a cathode ray beam and more particularly, but not necessarily exclusively, to novel means for producing and controlling the scanning deflection of a cathode ray beam. This means, in accordance with the invention, is substantially immune to interference from spurious signals and noise.

The invention finds primary application in connection with television apparatus where the beam must be swept over the target area in a cathode ray tube in synchronism with similar means at a more or less remote transmitter to provide an undistorted image to be viewed at the receiving point. In accordance with the invention in a preferred form, a controlling signal of varying energy content is derived. The significant variation in energy content is brought about by the timing of a locally generated or derived signal with respect to a signal received from the transmitter, the latter being indicative of the timed operation of a signal source such, for example, as a video camera. In the embodiment of the invention selected for purposes of illustration, each cycle of the locally derived signal has a rising portion followed by a rapidly decreasing portion and the received signal is in the form of a pulse having more or less constant amplitude. When the phase relationship of these two signals varies, the portion of the pulse which is added to the decreasing portion of the locally generated or derived signal is ineffective and only the energy content of the portion of the pulse not added to the decreasing portion exercises a control function. When the occurrence of the pulse is such that it coincides in its entirety with the rising portion of a cycle of the locally generated or derived signal then substantially the entire energy of the pulse is effective for control purposes. The timed occurrence of the pulse as well as its energy content is effective to control a deflection oscillator.

Accordingly, one object of the invention is to provide a novel system for synchronizing television or oscillographic apparatus which will have a high degree of immunity to spurious signals and noise impulses.

Another object is to provide novel means for controlling the oscillating rate of an oscillator as well as timing the individual oscillations.

A further object is to provide a novel means for obtaining control bias for an electrode of an oscillating discharge tube.

A still further object is to provide a novel system for controlling the repetition rate of signal generation of a discharge tube connected in a self-operating circuit.

Other objects and advantages of the present invention will, of course, become apparent and immediately suggest themselves to those skilled in the art to which the invention is directed from a reading of the following specification in connection with the accompanying drawings in which.

Figure 1:
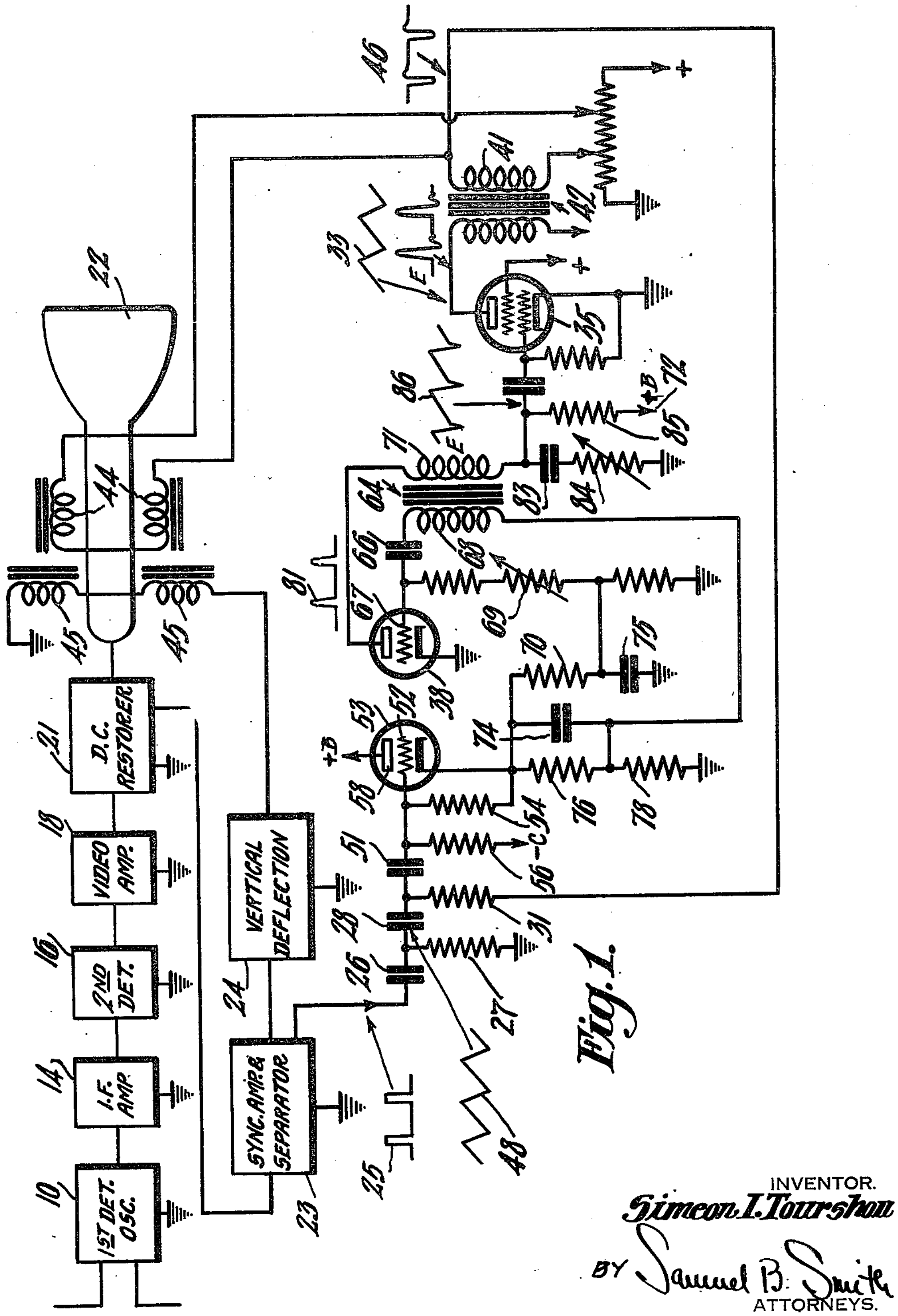
Fig. 1 is a schematic disclosure of the circuits of a portion of a television receiver embodying the present invention.

The invention as disclosed and as it will be described in connection with Fig. 1 of the drawings, comprises essentially the combination of an oscillator and a single multi-purpose tube which may be aptly referred to as a control tube. The oscillator is controlled in accordance with the invention by the development of a direct current oscillator bias (AFC) as well as by triggering pulses repeated in a modified or unmodified form depending upon the existing phase relationship between a timed impulse and a locally generated or derived signal. In the embodiment of Fig. 1 the timed pulses are the sync pulses customarily limited to constant amplitude which are produced or derived as the result of demodulation of a received television signal. In the form of the invention selected for purposes of illustration, control of the high frequency or line deflection traces of a cathode ray beam in an image producing tube is shown, but it will be understood that the invention is readily adapted for the control of the lower frequency or vertical deflection traces.

Referring for the present to Fig. 1 of the drawings, there is illustrated a portion of a television receiver of the superheterodyne type comprising the usual first detector 10 which incorporates a tunable oscillator, an intermediate frequency amplifier 14 and a second detector or demodulator 16. The output of the second detector 16 is furnished to a video amplifier 18 and a D. C. level setting device, or D. C. restorer 21, to control the image producing tube 22 in such a way that its cathode ray beam produces an intensity modulated pattern or raster on the tube target. This recreates the original image light values.

The detected signals are also supplied to a sync amplifier and separator 23 to select between the video and synchronizing signals. Since the invention is illustrated in connection with a horizontal (or line) deflection control, it will be assumed that the vertical (field or frame) deflection signals are then suitably selected to control the slow speed cathode ray beam deflection through any known form of vertical deflection control 24, such as the oscillator and output tube arrangement described by Tolson et al. in United States Patent No. 2,101,520 granted December 7, 1937. The other components so far explained and mentioned are well known in general and require no further explanation. However, solely for the sake of completeness of the disclosure and in order to provide an explanation of the setting of the invention for those desiring a detailed explanation of the operation of a television receiver, reference may be had to United States reissue patent to Carlson, No. Re. 20,700, granted April 19, 1938. Demodulation and amplification of the television signal together with sync separation may be accomplished as disclosed in an article by A. Wright entitled "Television receiver," published in RCA Review, March 1947 beginning at page 7.

The selected horizontal pulses 25 (that is, the line pulses for providing a control of the rapid motion of the cathode ray beam) are supplied at substantially constant amplitude from a known form of sync separator, or the like, to a circuit comprising a capacitor 26 and a resistor 27 which serves partially to differentiate the sync pulses to remove the vertical sync and such noise or interference pulses as may have a width greater than the horizontal sync pulses. The filtered output from the circuit 26—27 is supplied through a capacitor 28 to the grid of a control tube 53 with which is also associated an integrating circuit comprising the capacitor 28 and a resistor 31. The function of the integrating circuit is to derive a saw-tooth of voltage from a source of timed pulses, such as, for example the horizontal scanning circuits in a manner to be described. The capacitor 28, so far as the sync pulses 25 are concerned, serves only as a coupling condenser. For reasons of simplicity, the vertical input sync pulses are not shown, although in normal present day operation, both the vertical and the horizontal, or line sync pulses, correspond to those proposed and recommended by the industry and by the National Television System Committee and which are exemplified and shown on pages 22 and 23 of the book entitled "Television Standards and Practice" by Donald G. Fink, published by McGraw-Hill Book Company, Inc., New York, 1943. In this form, the sync signals represent those which have been recommended by the National Television System Committee and its panels. It should be understood, however, that the invention functions properly under the control of any suitable recurring pulse, but any illustrations herein given are applied, for simplicity, to the new standardized signal form.

A saw-tooth of current 33, produced in the plate circuit of an output tube 35 in a manner to be described in connection with the functioning of a controlled oscillator tube 38, produces an effective scanning current in the secondary 41 of a transformer 42. A set of horizontal deflection coils 44 surrounds an appropriate part of the tube 22 to produce line deflection of the cathode ray beam in the tube when supplied with current flowing in the secondary 41. The action of the coils 44 in conjunction with the action of a set of vertical (field or frame) deflection coils 45 produces the scanning raster. It will be understood that a damper tube (not shown) is usually provided for a purpose which is by now well known and may, for example, be of the type disclosed in United States patent to Schade, No. 2,309,672 granted February 2, 1943 which shows a damper tube in the plate circuit of a scanning output tube.

Figures 2, 3, 4, 5, 6, 7:
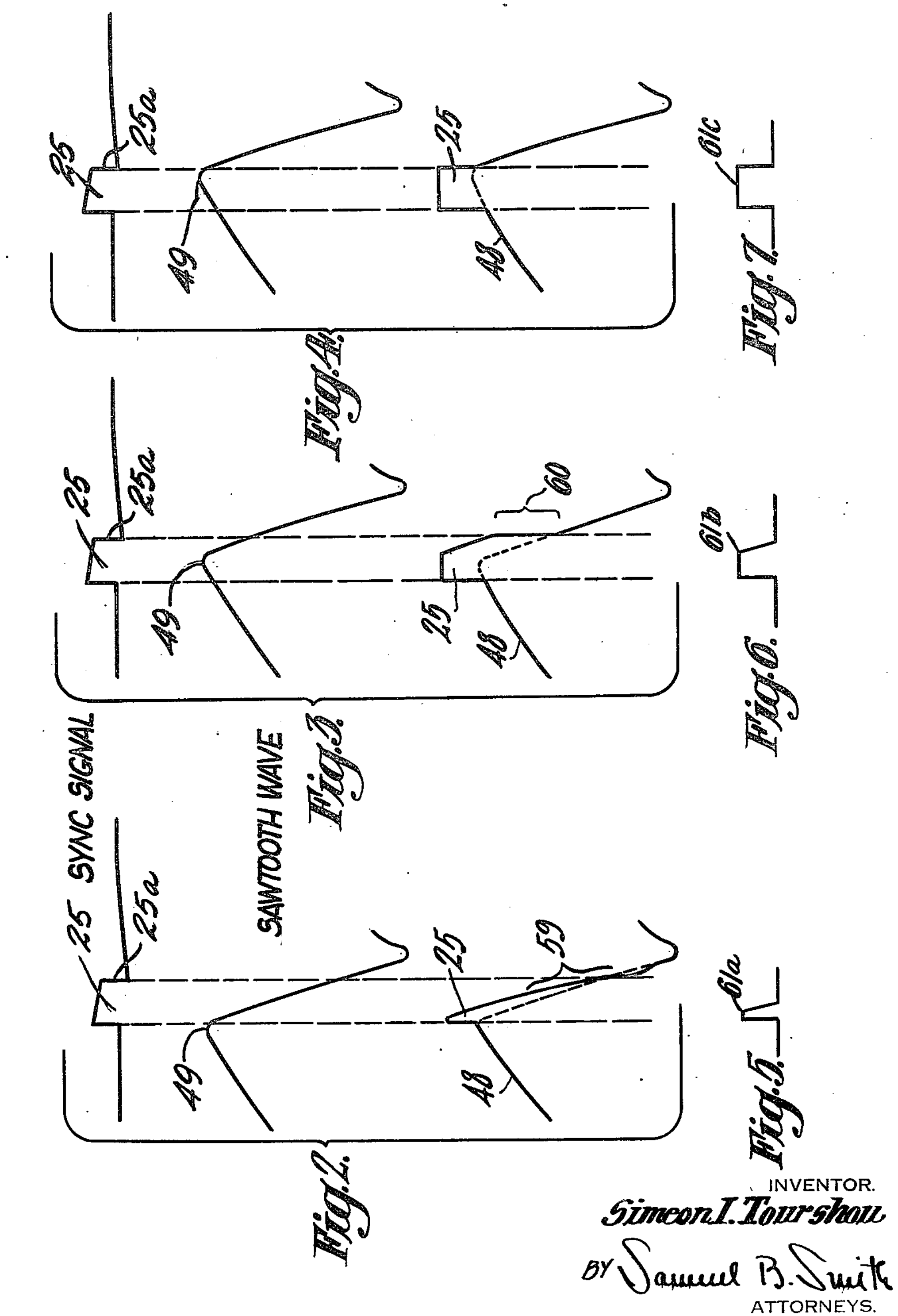
Figs. 2, 3 and 4 are representations of an assumed signal wave form referred to by way of example.
Figs. 5, 6 and 7 are representations of pulses derived as a result of operation of the apparatus in accordance with the invention.

A series of voltage pulses 46 of negative polarity are produced during each beam retrace or flyback interval in the transformer secondary 41 and it is these pulses which are shaped by the integrating circuit 28—31 to provide the saw-tooth of voltage, indicated in approximate form at 48, which is combined with the sync pulses 25 as shown by Figs. 2, 3 and 4 in a manner determined by changes in operating conditions. The resistor 27 is small as compared to the resistor 31 so that the pulses 46 are integrated by the circuit comprising the resistor 31 and the capacitor 28. The combined wave is applied through a coupling capacitor 51 to the grid 52 of a control tube 53. The tube 53 is biased by a grid resistor 54 and another resistor 56 from a source of negative voltage which is returned to the negative terminal of a D. C. voltage source (not shown), so that current flows in this tube only when sync pulses occur in a manner to be more fully described hereinafter. The anode 58 of the tube 53 is connected to the positive terminal of the D. C. source, or to a point on the usual voltage divider (not shown) for such a D. C. source. Since the tube 53 functions as a cathode follower, the direct connection to the D. C. source is feasible. Each sync pulse 25, only, which is superimposed on a cycle of the saw-tooth wave 48 produces plate current in the tube 53 which is in the form of pulses 61*a*, 61*b* or 61*c* shown in Figs. 5, 6 and 7 respectively. The variable width of the pulses represented in Figs. 5, 6 and 7 is a function of the phase relationship between the saw-tooth wave 48 and the occurrence of the sync pulses 25. It may be pointed out that when the oscillator which includes the tube 38 tends to run faster, that is, when the free-running frequency of the oscillator approaches the signal pulse frequency, only a small portion of the sync pulse falls on top of the saw-tooth cycle to the left of the peak or cusp as indicated at 49 in Fig. 2 and the cathode current pulse 61*a* (Fig. 5) is narrow. The remainder of the sync pulse appears as a distortion 59 in Fig. 2 or 60 in Fig. 3. In Fig. 2, the lagging edge 25*a* of the sync pulse 25 lags the cusp 49 by substantially the full width of the sync pulse. When the oscillator tends to run slower a large portion of the sync pulse falls on top of the saw-tooth wave cycle as represented in Fig. 4 and the cathode current pulse 61*c* (Fig. 7) is wide. In this phase condition, the lagging edge 25*a* of the sync pulse 25 only slightly lags the cusp 49.

The electrode circuits of the previously mentioned tube 38 are connected as shown in Tolson Reissue Patent Re. 20,338 granted April 20, 1937, so that the tube 38 functions as a "blocking oscillator." A transformer 64, preferably having an iron core as indicated on the drawings, provides an inductive coupling between the grid and plate circuits. A blocking capacitor 66 is connected as shown between the grid 67 of the tube 38 and the grid winding 68 of the transformer 64. An adjustable resistance 69 provides an adjustable leakage path to ground for the electrical charge stored in the capacitor 66. The plate circuit of the tube 38 includes the primary 71 of the transformer 64 and terminates at the positive terminal of the previously mentioned D. C. voltage supply source (not shown) which may be connected to a terminal 72. The adjustable resistor 69 regulates the free running speed of the oscillations which are developed.

A cathode capacitor 74 shunts the cathode resistor 76, the latter being connected in series with a resistor 78 so that the cathode current of the tube 53 passes through both of these resistors and the output connections are in the nature of cathode follower connections. The cathode capacitor 74 is charged by the cathode current pulses and its average charge is, therefore, also a function of the phase relationship between the sync signals 25 and the saw-tooth voltage 48. Its average voltage is low when the pulse has the duration of pulse 61*a* of Fig. 5 and is high when the pulse has the shape of the pulse 61*c* of Fig. 7. The voltage on the capacitor 74 is transferred to the oscillator grid 67 through a filter comprising a resistor 70 and a capacitor 75 to maintain the free running frequency of the oscillator very close to the frequency of the sync signals 25. The unbypassed resistor 78 serves to supply the low amplitude sync signal developed as a result of the cathode current pulses represented by Figs. 5 to 7 to the grid 67 of the tube 38 to trigger the oscillator. Since this sync signal supplied to the grid 67 has the same shape as the cathode current pulse of the tube 53, its energy is automatically variable with phase.

The functioning of the tube 38 with the circuit arrangement shown is such as to produce current pulses 81, the start of these pulses coinciding approximately with the pulses applied on the grid 67 of the tube 38 or preferably to the leading edge thereof. The current pulse 81 causes a saw-tooth voltage wave to appear across a capacitor 83 and an impulse voltage wave to appear across a resistor 84. The saw-tooth voltage across the capacitor 83 and the impulse voltage wave across the resistor 84 combine to form voltage wave 86. A resistor 85 controls the charging cycle of the capacitor 83. The voltage wave 86 is of the shape required to cause a saw-tooth current wave to pass through an inductive circuit having resistance, for example, the inductance represented by the transformer 42. This wave is amplified by the previously mentioned amplifier tube 35. In operation of the deflection circuits, as previously mentioned, a series of negative pulses 46 are developed, which are shaped in the low pass filter or integrating circuit 28—31, to provide the saw-tooth of voltage 48 which is desired to have a definite time relationship with respect to the sync pulses 25 but which may vary and by this variation provides the control signal of the invention.

From the foregoing description of the components and other circuit connections of Fig. 1, it is believed that the operation of the complete system will be understood. However, to review the operation briefly, a saw-tooth voltage wave 48 is combined with derived or received sync pulses 25, which, as indicated, are of shorter duration than the longer portion of the saw-tooth wave, in the general phase relationship of Fig. 3, for example, at one instant of operation. The tube 53 is so biased that the cathode current thereof is represented at this instant by Fig. 6 and a voltage pulse corresponding to this current pulse and with positive polarity is applied to the grid 67 of the tube 38. This tube is connected as a blocking oscillator with a manual frequency adjustment 69. This manual frequency adjustment is supplemented by the filtered voltage applied through the filter 70—75 from the capacitor 74 and maintains the frequency and phase of the oscillator very close to that of the sync signals 25.

As previously explained the trigger signal, as applied to the oscillator, has the same shape as a cathode current pulse, for example, the pulse 61*b* and, therefore, its energy content is automatically variable with phase. Thus, under extreme noise conditions and loss of the sync signal for a period of several scanning cycles, the oscillator frequency will be reduced and its operation will fall behind the normal timing. The reappearance of the sync signal in the wide form of Fig. 7 will hold the oscillator from further shift until the restoring voltage of the capacitor 74 can charge up the filter capacitor 75 to restore the normal phase condition. This operation prevents the undesired "roll" or "tear" of the image being produced by the cathode ray tube. This roll or tear effect results from the loss of a full cycle.

In accordance with the present invention, the synchronizing pulses 25 and sawtooth waves 48 derived from the oscillator are impressed on the grid of a tube which serves as both a phase detector and a frequency control for the oscillator.

The superposition of the sync signals 25 on the saw-tooth wave 48 also assists in reducing the effect of noise, since most of the noise pulses, except those in the immediate vicinity of sync pulses are below the cut-off point of the tube 53.

Outstanding advantages of a system embodying this invention are the following:

Simplicity and low cost AFC system since only one additional triode, serving as a combined phase detector and frequency control tube is needed to be added to the common impulse sync system, and this triode may be one-half of a dual triode. The other half of this triode may be devoted to another purpose, for example, it may be used as the oscillator.

A greater ability to respond to phase modulation of the transmitted signal, such as sometimes is caused by hum or instability in the sync generator of the transmitter.

A greater freedom from "hunting" and drift, such as is encountered in some known A. F. C. systems.

Having now described the invention what is claimed and desired to be secured by Letters Patent is the following:

1. In a television system, a device including an oscillator, the rate of which is controllable, for producing a voltage output wave form in which the total potential change in one polarity direction extends over a considerably greater period of time than the corresponding total potential change in the opposite polarity direction, a source of sync signal pulses, means to combine the voltage output wave form with the sync signal pulses in such a phase relationship that the sync signal pulses normally coincide with a polarity change of the voltage output wave, means responsive to that portion of the sync signal pulses that overlaps that part of the voltage output wave form having a potential change in the said one polarity direction for producing a control voltage, and means to apply the control voltage to said oscillator to maintain successive sync signal pulses in the said normal phase relationship with respect to the voltage output wave.

2. In a television system having a beam deflection coil producing voltage pulses and means for converting said pulses to a voltage wave which has a maximum peaked excursion in a predetermined polarity direction, a source of sync signals, said sync signals being in the form of pulses, means to combine said sync signals and said voltage wave in such a phase relationship that the sync signals coincide with that portion of the sawtooth having the maximum peaked excursion in a predetermined direction during normal operation of said system, means responsive to said combining means for producing a control voltage, an oscillator for controlling operation of said deflection coil, and means to apply said control voltage to said oscillator to maintain operation of said system with said sync signals in said normal phase relationship.

3. In a television system, a device producing a voltage wave having a sawtooth wave form in operation, a source of sync signals, said sync signals being in the form of pulses, means for combining said sawtooth voltage wave and said sync signals whereby the phase relationship of said sync signals with respect to said sawtooth wave is such that their peaks occur simultaneously in desired operation of the system, means for developing an output voltage in accordance with phase changes in the peaks of one wave form with respect to the peaks of the other, and means for applying said output voltage to control said voltage wave producing device.

4. In a television system, a device producing a voltage wave having a sawtooth wave form, a source of sync signals, said sync signals being in the form of pulses, means for additively combining said sawtooth voltage wave and said sync signals whereby the phase relationship of said sync signals with respect to said sawtooth wave is such that their peaks occur simultaneously during desired operation of the system, means comprising a vacuum tube for developing an output voltage in accordance with phase changes in the peaks of one wave form with respect to the peaks of the other, means for applying said output voltage to control said voltage wave producing device.

5. In a television system, a device having an output wave form which has a maximum peaked excursion in a predetermined polarity direction, a source of sync signals, said sync signals being in the form of pulses, means to combine said sync signals and said wave form additively in such a phase relationship that the sync signals coincide with that portion of the wave form having the maximum excursion in a predetermined polarity direction, means responsive to the resulting variable direction output of said combining means for producing a control voltage, an oscillator for controlling said first named device, and means to apply said control voltage to said oscillator.

6. A deflecting circuit having an oscillator therein, means for producing a voltage wave of recurring peaks having a definite time relationship with respect to the frequency of said oscillator, means for superimposing received sync pulses upon recurring peaks of said voltage waves during normal operation of said circuit, means for producing a frequency control voltage having a value which changes in response to a change in the relative phase positions of said sync pulses and the recurring peaks of said wave, and means for controlling the frequency of said oscillator in accordance with said control voltage to maintain normal operation.

7. A deflecting circuit having an oscillator therein, means for producing a sawtooth voltage wave having a definite time relation with respect to frequency of said oscillator, means for superimposing received sync pulses upon peaks of said sawtooth voltage wave, means for producing a frequency control voltage having a value which changes in response to a change in the relative phase positions of said sync pulses and said wave, and means for controlling the frequency of said oscillator in accordance with said control voltage to maintain said sync pulses superimposed upon the peaks of said sawtooth voltage wave.

8. In combination a blocking oscillator having a grid condenser and capable of having its rate of oscillation controlled by the application thereto of a frequency controlling signal, automatic frequency control means for producing a frequency controlling signal, said frequency controlling signal comprising pulses variable in duration, and signal transfer means for applying said controlling signal to said condenser as a uni-directional voltage.

9. In a television system, a source of sync signals, a sawtooth wave voltage source, a vacuum tube in which said sync signals and said sawtooth voltage wave are combined in such a phase relationship that the sync signals coincide with that portion of the sawtooth having the maximum excursion in a predetermined polarity direction to produce a combined signal, means to render said tube responsive to said combined signal, means for producing a uni-directional control voltage from the output of said vacuum tube and means for applying said control voltage to control said source thereby to maintain said sync signals in coincidence with the portion of the sawtooth having the maximum excursion in a predetermined polarity direction.

10. In a television system, a source of sync signals, a sawtooth wave voltage source, a vacuum tube in which said sync signals and said sawtooth voltage wave are combined in such a phase relationship that the sync signals coincide with that portion of the sawtooth having the maximum excursion in a predetermined polarity direction, means to bias said tube whereby to be responsive only to peaks of said sync signals, means for producing a uni-directional control voltage from the output of said vacuum tube and means for applying said control voltage to control said source thereby to maintain said sync signals in coincidence with the portion of the sawtooth having the maximum excursion in a predetermined polarity direction.

11. In a television system, a device including an oscillator, the rate of which is controllable, for producing a voltage output of sawtooth wave form having a positive going portion and a negative going portion, a source of sync signal pulses, means to combine the voltage output wave form with the sync signal pulses in such a phase relationship that the sync signal pulses normally coincide with a peak of the voltage output wave, means responsive to that portion of the sync signal pulses that overlaps the positive going portion of the sawtooth voltage output wave form for producing a control voltage, and means to apply the control voltage to said oscillator to maintain successive sync signal pulses in the said normal phase relationship with respect to the voltage output wave.

12. In a television system, a device including an oscillator, the rate of which is controllable, for producing a voltage output wave form in which the total potential change in one polarity direction extends over a considerably greater period of time than the corresponding total potential change in the opposite polarity direction, said oscillator comprising a space discharge tube having at least a control grid, a grid condenser connected to said oscillator control grid, a source of sync signal pulses, means to combine the voltage output wave form with the sync signal pulses in such a phase relationship that the sync signal pulses normally coincide with a polarity change of the voltage output wave, a space discharge tube having a cathode, an anode and a control grid, means connected to said grid to bias said tube to be responsive to that portion of the sync signal pulses that overlaps that part of the voltage output wave form having a potential change in the said one polarity direction, a cathode resistor in the cathode circuit of said second named tube, a capacitor shunting said resistor, said tube in operation producing a control voltage across said cathode resistor, and means to apply the control voltage to the grid of said oscillator tube to maintain successive sync signal pulses in the said normal phase relationship with respect to the voltage output wave.

13. A phase detection system comprising an electron discharge device having at least a cathode, anode and a control electrode, an anode voltage source, a resistance interposed in the anode-cathode circuit between the cathode and a terminal on the negative side of the anode voltage source, a capacitor connected across at least a portion of the resistance, circuits for impressing between the control electrode and said terminal waves, each cycle of which has a cusp intervening between a longer and shorter portion of the cycle, together with pulses of less duration than the longer portion of the waves, a second potential source connected with the control electrode and with the resistance to bias the said electrode normally against substantial flow of cathode current in the tube but permitting cathode current flow when the cusp of the wave occurs between the leading and lagging edges of a pulse and of varying duration dependent upon the amount of lag from time coincidence of the lagging edge of said pulse from the cusp of the wave, and an output connection to a point on said resistance.

14. A phase detection system comprising an electron discharge device having at least a cathode, anode and a control electrode, an anode voltage source, an impedance interposed in the anode-cathode circuit between the cathode and a terminal on the negative side of the anode voltage source, a capacitor connected across at least a portion of the impedance, circuits for impressing pulses derived from synchronizing information between the control electrode and said terminal together with waves each cycle of which has a cusp intervening between a longer and a shorter portion of the cycle, the capacity value of the capacitor and the value of the impedance across which it is connected being such as to offer low impedance to the pulse and wave currents and to attain a charge representative of the average value of the detected resultant current of said pulses and waves, a second potential source co-acting with the impedance to bias the control electrode normally against flow of substantial cathode current in the tube but permitting cathode current flow when the cusp of the wave occurs between the leading and lagging edges of a pulse and of varying duration dependent upon the amount of lag from time coincidence of the lagging edge of said pulse from the cusp of the wave, and an output connection for taking off from across at least a portion of said impedance a potential representative of the average value of said current.

15. A phase detection system comprising an electron discharge device having at least a cathode, anode and a control electrode, an anode voltage source, a resistance in the anode-cathode circuit, a capacitor shunted across a portion of the resistance, circuits for impressing pulses on the control electrode together with waves each cycle of which has a cusp intervening between a longer and a shorter portion of the cycle, a second potential source co-acting with the resistance to bias the control electrode normally against substantial flow of cathode current in the tube but permitting cathode current flow when the cusp of the wave occurs between the leading and lagging edges of a pulse and of varying duration dependent upon the amount of lag from time coincidence of the lagging edge of said pulse from the cusp of the wave, the capacity of the capacitor being of such value as to offer low impedance to the pulse and wave currents and to attain a charge representative of the average value of the detected resultant current of said pulses and waves, and connections for deriving respectively a unidirectional potential representative of the variations across the portion of the resistance shunted by the condenser and for deriving an AC potential representative of the variations developed across the portion of the resistance not shunted by the capacitor.

16. In a system for synchronizing the frequency of an oscillator with a synchronizing signal, means for deriving a substantially sawtooth wave from said oscillator, means for deriving from said synchronizing signal a pulse having a shorter duration than said wave, means for combining said wave and said pulse to produce current impulses of substantially constant amplitude and varying duration as a function of the magnitude of the lag from time coincidence of the lagging edge of said pulse with the cusp of said wave, means for producing a controlling potential representative of the average value of said current impulses for controlling the frequency and phase of said oscillator, and a connection for impressing the controlling potential on the oscillator.

17. In a system for synchronizing the frequency of an oscillator with a synchronizing signal, circuits for producing a substantially sawtooth wave and also producing short duration impulses of the same repetition rate as the wave, said circuits including an oscillator tube having a control electrode, devices for controlling the frequency of the oscillator, a source of synchronizing pulses, circuits for shaping and feeding the synchronizing pulses and said first-mentioned circuit impulses to the control devices, said control devices including an electron discharge device having at least an anode, cathode and control electrode, means including an impedance connected in the cathode-anode circuit of said electron discharge device for biasing its control electrode normally against substantial flow of cathode current but permitting cathode current flow when the cusp of the wave occurs between the leading and lagging edges of a pulse and of varying duration dependent upon the amount of lag from time coincidence of the lagging edge of said pulse from the cusp of the wave, and a connection between said impedance and the control electrode of the oscillator.

18. In a system for synchronizing the frequency of an oscillator with a synchronizing signal from which synchronizing pulses are derived, circuits for generating substantially sawtooth wave suitable for impression on a deflecting coil of a cathode ray tube, said circuits including a blocking tube oscillator having at least an anode, cathode and grid, a phase detector tube for controlling the frequency of the oscillator having at least a cathode, anode, and a control electrode, an anode voltage source, an impedance interposed between cathode and ground in the anode-cathode circuit, a capacitor connected across at least a portion of the impedance, circuits for impressing synchronizing pulses on the control electrode together with a wave derived from the sawtooth wave, a second potential source coacting with the impedance to bias the control electrode normally against flow of substantial cathode current in the tube but permitting cathode current pulse flow when the cusp of the derived wave occurs between the leading and lagging edges of the pulse and of varying duration dependent upon the amount of lag from time coincidence of the lagging edge of said pulse from the cusp of the wave, and a low-pass filter connection from said impedance to the grid of the oscillator.

19. An oscillation generator comprising an electronic tube having an anode, cathode and at least one grid, in combination with devices for controlling the frequency of the current generated by the oscillator, said control devices including a control tube also having at least an anode, cathode and grid, two resistances serially connected in the cathode circuit of the control tube, a low impedance connection between a terminal of one of said resistances and the cathode of the control tube, a connection including controllable resistance between said terminal and the grid of the oscillation generator, and a capacitor and a coil connected serially between the grid of the oscillation generator and the junction of said two first-mentioned resistances.

20. A blocking tube oscillator comprising at least an anode, cathode and control grid, a phase detector and frequency control tube for the oscillator also comprising at least an anode, cathode and control grid, a resistance shunted by a capacitor in the cathode circuit of the control tube and a D. C. connection between the cathode of the control tube and the grid of the oscillator whereby the D. C. potential of the oscillator grid varies with variation in flow of cathode current through the resistor in the cathode circuit of the control tube.

SIMEON I. TOURSHOU.

REFERENCES CITED

The following references are of record in the file of this patent:

UNITED STATES PATENTS

| Number | Name | Date |
|---|---|---|
| 2,209,507 | Campbell | July 30, 1940 |
| 2,339,536 | Wendt | Jan. 18, 1944 |
| 2,352,541 | Harper | June 27, 1944 |
| 2,358,545 | Wendt | Sept. 19, 1944 |
| 2,389,025 | Campbell | Nov. 13, 1945 |
| 2,420,303 | De France | May 13, 1947 |
| 2,427,366 | Mozley | Sept. 16, 1947 |
| 2,459,699 | Hallmark | Jan. 18, 1949 |
| 2,490,404 | Bliss | Dec. 6, 1949 |
| 2,490,500 | Young | Dec. 6, 1949 |